United States Patent

Strong

[15] 3,662,601
[45] May 16, 1972

[54] HYGROMETER

[72] Inventor: Roger K. Strong, Doylestown, Pa.
[73] Assignee: Honeywell Inc., Minneapolis, Minn.
[22] Filed: Nov. 28, 1969
[21] Appl. No.: 880,762

[52] U.S. Cl. .................................................. 73/337.5
[51] Int. Cl. ................................................... G01n 19/10
[58] Field of Search ............................. 73/337.5, 393

[56] References Cited

UNITED STATES PATENTS

| | | | |
|---|---|---|---|
| 2,105,683 | 1/1938 | Burdick | 73/337.5 |
| 2,286,710 | 6/1942 | Bohnstedt | 73/337.5 |
| 3,040,569 | 6/1962 | Gray | 73/393 X |
| 3,163,729 | 12/1964 | Flagg | 73/337.5 |

*Primary Examiner*—Louis R. Prince
*Assistant Examiner*—Denis E. Corr
*Attorney*—Arthur H. Swanson, Lockwood D. Burton and John Shaw Stevenson

[57] ABSTRACT

An apparatus to convert any extremely small unnoticeable non linear expanding and contracting movement exhibited by a sensing element, such as a sensing element that expands in a non linear manner with changes in the relative humidity of an atmosphere into a greatly enlarged amplified motion. An example of this latter motion is the motion exhibited by a pointer moving along an associated scale and/or the motion of a pen moving along a chart which will provide an accurate linear indication of the percent of relative humidity being sensed by the aforementioned sensing element.

2 Claims, 6 Drawing Figures

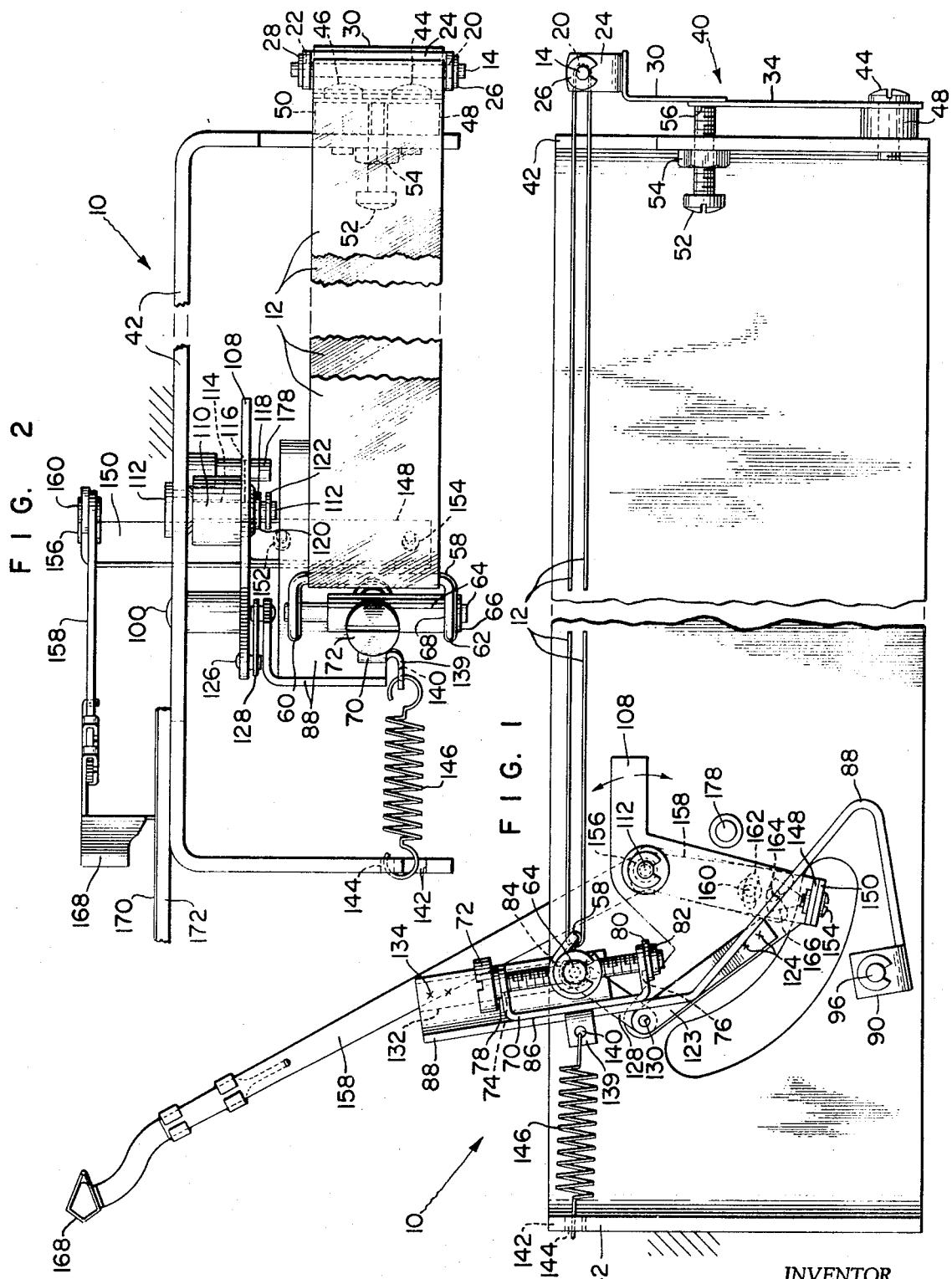

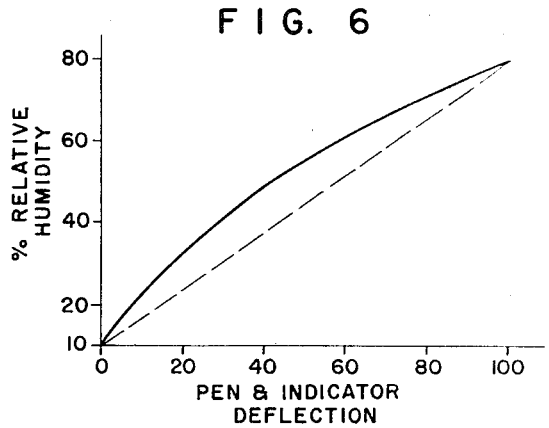
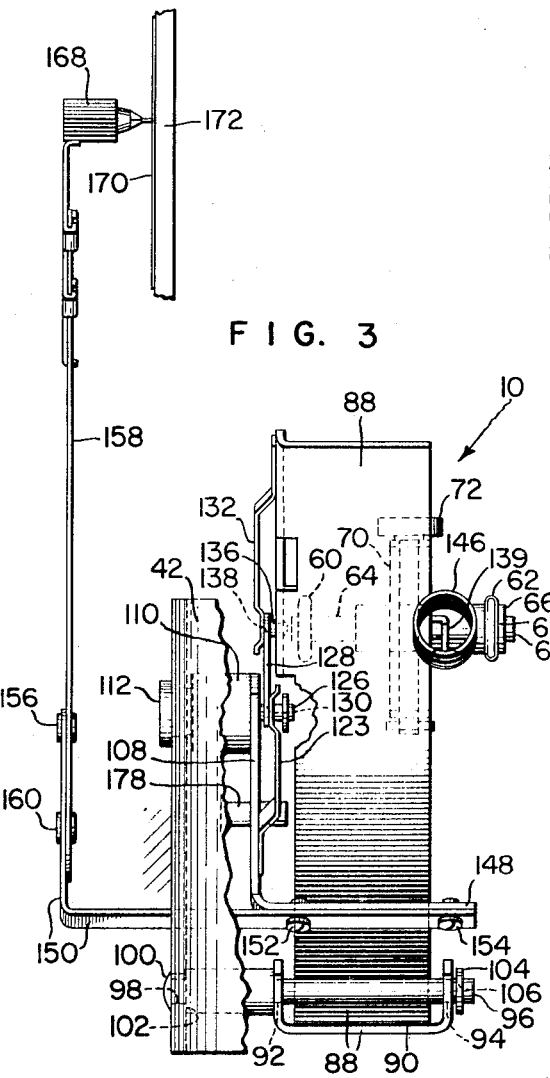
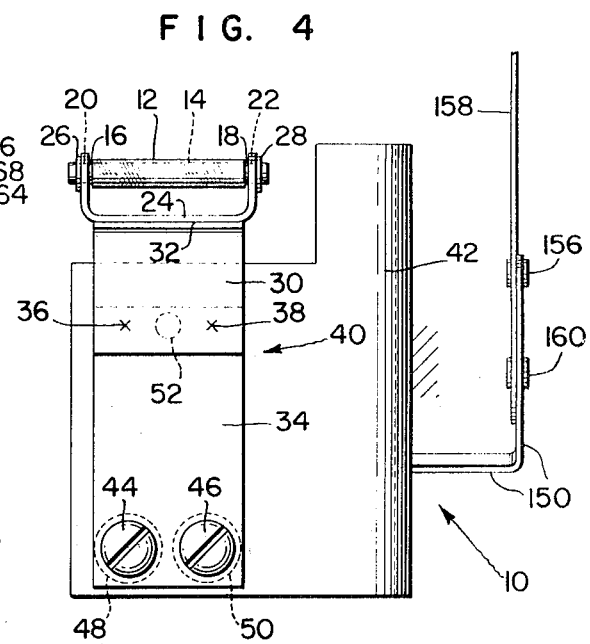
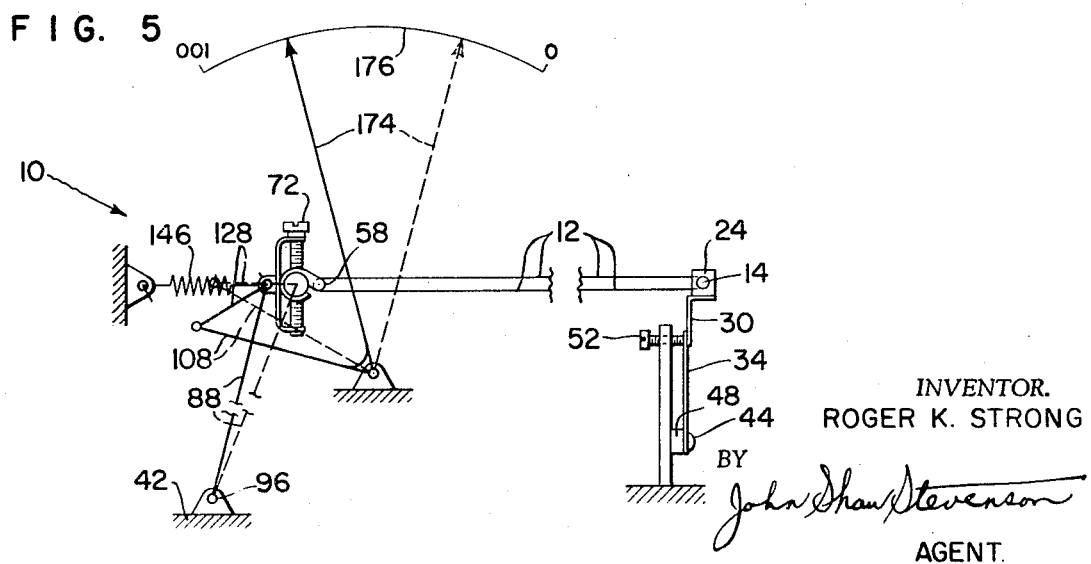
INVENTOR.
ROGER K. STRONG
BY
John Shaw Stevenson
AGENT.

HYGROMETER

One of the problems that is encountered in the use of humidity sensing elements is that they elongate and contract in a minute non linear relationship with changes that occur in a variable e.g. relative humidity of an atmosphere that they are employed to measure. It is therefore necessary to provide an indicator actuating and/or pen actuating apparatus that will not only amplify the movement experienced by these humidity sensing elements but also transform the non linearity output motion introduced by these sensing elements into indicator or pen arm movement that is linear with respect to the magnitude of the percent of relative humidity being sensed by the sensing elements.

It is therefore an object of the present invention to provide an apparatus for linearizing and amplifying a non linear input motion of a sensor.

It is a more specific object of the invention to provide an apparatus of the aforementioned type that is useful in converting extremely small unnoticeable non linear expanding and contracting movements exhibited by sensing elements, such as a humidity sensing element, into greatly enlarged amplified motion exhibited by the motion of a pointer along an associated scale and/or the motion of a pen along a chart to provide an accurate indication of the percent of relative humidity being sensed by the sensing element.

It is another object of the present invention to disclose an apparatus of the aforementioned type in which a first elongated crank member is connected for movement with one end of the aforementioned sensing elements and a short pivotal link is employed to connect the first crank member with a second elongated output crank member so that motion of the latter member can be employed to indicate the true magnitude of the percent of relative humidity of the atmosphere under measurement on a chart or on an indicating scale.

It is another object of the present invention to employ a simplified motion amplifying and linearizing apparatus that is of a rugged construction so that it can withstand intensive abuses which such instruments encounter in industrial plant process applications.

A better understanding of the present invention may be had from the following detailed description when read in conjunction with the accompanying drawings in which:

FIG. 1 is a rear elevation view of the motion amplifying and linearizing apparatus;

FIG. 2 is a top view of the motion amplifying and linearizing apparatus;

FIG. 3 shows one end view of the aforementioned motion amplifying and linearizing apparatus with the humidity sensing element removed;

FIG. 4 is an end view of the aforementioned motion amplifying and linearizing apparatus taken from an end that is opposite that shown in FIG. 3;

FIG. 5 is a schematic rear view of the apparatus shown in FIGS. 1-4 to show how it can be employed as an indicator instead of the pen moving mechanism shown in these latter mentioned Figures; and FIG. 6 is a graph to show the non linear characteristics of the humidity sensing element in solid line form and the beneficial linearizing effect which the pen or pointer moving apparatus provides as shown by the dotted line in this figure.

The aforementioned apparatus for transforming the minute non linear input motion of a humidity sensing member into a motion that is linear with respect to the percent relative humidity being sensed by the sensing member is identifiable in FIGS. 1-5 as reference numeral 10.

FIGS. 1-5 shows a sensing element 12 that elongates and contracts in a minute non linear relationship with changes occurring in the atmosphere surrounding this element 12 as the humidity is respectfully increased and decreased.

The humidity sensing element 12 is preferably made out of a continuous nylon belt construction. It should be understood that materials other then nylon can be used for the belt and sensing element 12 whose length increases or decreases as changes in the relative humidity of an atmosphere being measured is respectfully increased and decreased in substantially the same manner as nylon.

One looped end portion of the humidity responsive belt 12 is shown retained in physical contact with the outer surface of the stud 14. The stud 14 in turn has diametral outer end portions 16, 18, for passing through apertured wall portions 20, 22, formed in a U-shaped support 24. The stud 14 is held in place for rotation on the support 24 by means of cotters 26, 28.

The inverted L-shaped bimetal alloy member 30 connected by welding at 32 to the support 24 the stainless steel member 34 attached to member 30 by welding at 36, 38 form an integral ambient temperature compensating unit 40. This compensating unit 40 is fixed to a mounting plate 42, by means of screw connections 44, 46, and spacers 48, 50. The mounting plate 42 is in turn connected to a casing, not shown.

A zero adjusting screw 52 is shown threadedly connected for movement through an embossed portion 54 of mounting plate 42 that is integral with the mounting plate 42 and also connected at its end portion 56 for movement with the bimetal alloy member 30 and the rest of the components of the temperature compensating unit 40.

The other looped end portion of the humidity responsive belt 12 is shown retained in physical contact with a cylindrical rod shaped member 58. As is best shown in FIG. 1 the opposite ends 60, 62, of the rod 58 are wrapped about associated opposite end portions of a stud 64. A cotter 66 mounted in and about its cylindrical recessed wall portion and a shoulder portion 68 of the stud 64 and plate to retain the rod shaped member 58 and its end portions 60, 62, fixed against longitudinal movement along stud 64.

As is best shown in FIG. 1 a channel shaped bracket 70 surrounds the top, bottom and left sides of the stud 64. A span adjusting screw 72 is shown extending through wall portions 74, 76, forming apertures in the upper and lower flanges of the bracket 70. Spring washers 78, 80, are shown between the head of the screw 72 and the top flange of the bracket 70 and between the lower flange of bracket 70 and a nut 82 mounted on the span adjusting screw 72.

The span adjusting screw 72 is shown having a central threaded portion 84 thereof in threaded engagement with the stud 64. Rotation of the span adjusting screw 72 in a selected clockwise and counterclockwise direction allows the stud 64, the rod shaped member 58 and one end of the humidity responsive belt 12 that is associated with the member 58 to be moved to any one of a number of desired span adjusting positions along the screw member 72 that is either above or below the position shown in FIG. 1.

The bracket 70 is fixed by welding at 86 to an elongated input crank member 88. As is best shown in FIG. 3 the crank member 88 has a U-shaped portion 90 at its lower end that has two aligned aperture wall portions 92, 94 therein. The U-shaped portion 90 in turn is pivotedly connected for rotatable movement about a stud 96.

As is best shown in FIG. 3 the stud 96 has an end portion 98 that passes through the mounting plate 42. The outer end 100 of the stud 96 is shown peened over against the outer surface of the mounting plate 42 to retain it in fixed relation therewith while a diametral portion 102 is retained in contact with the inner surface of this mounting plate 42.

A cotter 104 retained in a grooved out portion 106 on the inner end of the stud 96 is employed to prevent the U-shaped portion 90 that forms an integral part of the crank member 88 from being slid off the right end of the stud 96.

As is best seen in FIG. 2 the output crank member 108 has a hub portion 110 that is fixedly staked thereto to form an integral part and is mounted for clockwise and counterclockwise rotary movement on the stub shaft 112. The stub shaft 112 in turn passes through and is fixedly staked to the mounting plate 42 and protrudes through cylindrical apertured wall portion 114, 116, as well as the cylindrical apertured wall portion 118 forming an embossed portion 120 on the crank member 108.

A cotter 122 is fixed in a groove, not shown, in the stub shaft 112 to prevent the crank arm from sliding off the free end of the shaft 112.

A bent spring plate 123 made of spring steel or equivalent resilient material is fixedly connected by a welding connection at 124 to the side of the output crank member 108 at one of its ends and in spring tight engagement with the inner shank end of a rivet 126 that is fixed to and protrudes outwardly from the crank member 108 at its other end.

As is best shown in FIGS. 1 and 3, a link 128 is employed to connect the input crank member 88 to the output crank member 108. A cylindrical apertured wall portion 130 is shown formed in one end portion of the connecting link 128 for allowing mounting and rotatable movement of the link 128 on the outer surface of the stationary rivet 126.

The input crank member 88 has a bent spring plate 132 made of a spring steel or equivalent resilient material. This spring plate 132 is fixedly connected at one end by a welding connection at 134 to the side of the input crank member 88 and has another end in spring tight engagement with the inner shank end of the rivet 136 that is fixedly staked to and protrudes outwardly from the input crank member 88.

A second cylindrical apertured wall portion 138 is shown formed in another end portion of the connecting link 128 for allowing the mounting of and the rotatable movement of the link 128 on the outer surface of the rivet 136 that extends from the input crank member 88.

As is best shown in FIGS. 1 and 2 the input crank member 88 has a lug portion 139 extending therefrom that has a cylindrical apertured wall portion 140 therein.

A wall 142 forming a slot in the mounting plate 42 and an adjacent drilled out apertured wall portion 144 in plate 42 provides a means whereby one end of an extension spring 146 can be connected to the stationary mounting plate 42. The other end of the spring 146 is shown passing through the apertured wall 140 so that it will continuously apply a spring bias to the input crank 88 that will maintain a preselected relatively constant amount of tension on the humidity responsive element 12.

As is best shown in FIG. 3 the output crank member 108 has a portion 148 extending therefrom. An angular shaped plate 150 is fixedly connected at one end by a pair of screw connecting members 152 and 154 for movement with the portion 148 of the output crank member 88.

A first rivet 156 extending through another end of the plate 150 and the lower end of an angularly shaped pen arm 158 provides a pivot joint between these parts.

FIGS. 1 and 3 show a second rivet 160 connected to and passing through the pen arm 158 and through a wall portion 162 forming a slot in the angular shaped plate 150.

The lower end of the pen arm 158 terminates in a key shaped wall portion 164 that is in alignment with and within the confines of slotted wall 166 formed in the angular shaped plate 150.

By inserting the end of the screwdriver through slot 166 into engagement with the wall forming the key slot 164 in the pen arm 158 and moving it in a clockwise or counterclockwise direction a zero adjustment of pen arm 158 and the pen 168 adjustedly attached thereto can be effected.

As shown in FIG. 1 the pen 168 engages and moves along the chart 170 that is supported on a chart plate 172 as changes in percent of relative humidity sensed by the humidity sensing element 12 are altered.

It should be understood that an indicator 174 for movement along a percent of humidity indicating scale 176 such as is shown in FIG. 5 can be connected to the portion 148 of the output crank member 108 shown in FIG. 3 in lieu of the pen arm 158 and pen 168 attached thereto that is presently shown in FIG. 3.

A pin 178 is shown fixedly connected to and protruding out of the mounting plate 42 to provide a stop for the output crank 108 and thereby prevent it from being rotated beyond a preselected undesired limit.

FIG. 5 shows in schematic form all of the elements previously described in the other figures except the pen 168, and pen arm 158.

FIG. 6 shows in curved solid line form the percent of movement that would occur if the pen arm 158 or an indicator 174 were moved in direct response to the expansive and contractive movements of the humidity sensing element 12 as changes in atmospheric conditions about this element occur.

FIG. 6 also shows in dash line form the percent of movement that would occur if the apparatus 10 which has heretofore been described were employed between the humidity sensing element 12 and an associated pen arm 158 or an indicator 174.

As changes occur in the atmosphere surrounding humidity responsive element 12 these changes will cause it to alter in length. The effect of these changes will be transferred in the form of a change in motion through input crank 88, link 128 and output crank 108 to either a pen arm 158 and an associate pen 168 as shown in FIGS. 2 and 3 or an indicator as shown in FIG. 5.

As the aforementioned transfer of motion from the humidity sensing element 12 to a pen 168 or a pointer 174 takes place the apparatus 10 will automatically modify the changes that are being introduced by the humidity responsive element 12 so that the record inscribed on the chart 70 and the position to which the pointer is pointing on the indicating scale will be in linear relationship with the magnitude of the percent of humidity of the atmosphere under measurement.

The embodiments of the invention in which an exclusive property or privilege is claimed are defined as follows:

1. A non linear to linear motion transducing apparatus, comprising a sensing member, the sensing member being expandable and contractable in a non linear manner with respect to associated increases and decreases occurring in the magnitude of the variable under measurement, a motion transmitting input crank connected for movement by an adjustably mounted pivot means with said sensing member at one end and mounted for rotation on a stationary pivot at its other end, a motion receiving output crank connected to a second stationary pivot, a connecting link pivotally connected at one end to the free end of the input crank and being pivotally connected at its opposite end to the free end of the output crank, and a link fixedly connected to the output crank for movement with the pivoted end of the output crank for transmitting motion that is linear with respect to changes that occur in the magnitude of said variable and wherein the sensing member is a continuous belt containing a single closed loop that is mounted solely on two spaced apart cylindrical members and a means is provided to retain a biasing force on said sensing member as said increases and decreases in the magnitude of the variable occur and wherein the sensing member is connected for movement with a pivoted support member, and wherein the pivoted support member is comprised of an ambient temperature compensating means constructed of a bimetal.

2. A non linear to linear motion transducing apparatus, comprising a sensing member, the sensing member being expandable and contractable in a non linear manner with respect to associated increases and decreases occurring in the magnitude of the variable under measurement, a motion transmitting input crank connected for movement by an adjustably mounted pivot means with said sensing member at one end and mounted for rotation on a stationary pivot at its other end, a motion receiving output crank connected to a second stationary pivot, a connecting link pivotally connected at one end to the free end of the input crank and being pivotally connected at its opposite end to the free end of the output crank, and a link fixedly connected to the output crank for movement with the pivoted end of the output crank for transmitting motion that is linear with respect to changes that occur in the magnitude of said variable and wherein the sensing member is a continuous belt responsive to changes in humidity containing a single closed loop, a means is provided to retain a biasing force on said member as said increases and decreases in the magnitude of the variable occurs and wherein the adjustably mounted pivot means is a span adjusting linkage employed as a part of said connection extending between the input crank and said sensing member.

* * * * *